United States Patent [19]

Eryaman et al.

[11] Patent Number: 5,457,734
[45] Date of Patent: Oct. 10, 1995

[54] MULTI-BAND CELLULAR RADIOTELEPHONE SYSTEM ARCHITECTURE

[75] Inventors: Can A. Eryaman, Frankford; Takeo Kanai, Bridgewater, both of N.J.

[73] Assignee: AT&T IPM Corp., Coral Gables, Fla.

[21] Appl. No.: 89,314

[22] Filed: Jul. 8, 1993

[51] Int. Cl.[6] ..................................................... H04Q 7/36
[52] U.S. Cl. ................................ 379/58; 379/59; 455/22; 455/33.1; 455/34.1; 455/101
[58] Field of Search ........................... 370/95.3; 375/1; 379/56, 58, 59; 455/20, 21, 22, 33.1, 33.2, 54.1, 101, 102, 34.1

[56] References Cited

U.S. PATENT DOCUMENTS

| | | | |
|---|---|---|---|
| 3,626,112 | 12/1971 | Henquet | 379/58 |
| 4,001,691 | 1/1977 | Gruenberg | 455/22 |
| 4,144,496 | 3/1979 | Cunningham et al. | 379/59 |
| 4,284,848 | 8/1981 | Frost | 379/59 |
| 4,972,455 | 11/1990 | Phillips | 379/59 |
| 5,067,173 | 11/1991 | Gordon et al. | 455/33.1 |
| 5,220,680 | 6/1993 | Lee | 455/102 |

FOREIGN PATENT DOCUMENTS

| | | | |
|---|---|---|---|
| 0015341 | 1/1983 | Japan | 455/101 |
| 0224424 | 9/1990 | Japan | 455/34.1 |
| 0174827 | 7/1991 | Japan | 455/34.1 |
| 3234131 | 10/1991 | Japan | 455/34.1 |

OTHER PUBLICATIONS

Lee, "Mobile Cellular Telecommunications System," 1989 pp. 5 and 6.

*Primary Examiner*—Curtis Kuntz
*Assistant Examiner*—William Cumming
*Attorney, Agent, or Firm*—Alfred G. Steinmetz

[57] ABSTRACT

A dual frequency cellular radiotelephone system, having different service providers, serving mobile subscribers at first and second distinct frequency ranges, uses frequency conversion techniques, to serve both frequency ranges with a minimum of equipment duplication. A first service group is serviced by a first system including a mobile switching center (MSC), a first transmission unit, a first base station controller (BSC), a first base transceiver, a first linear amplifier and first antenna. The entire train of components is designed to support air interface transmissions at the first frequency band at which the first group is served. A signal frequency converter, connected to a transceiver of the first frequency band, converts downlink signals from the first frequency range to the second frequency range and uplink signals from the second frequency range to the first frequency range. Signals transmitted by the second antenna are within the second band of frequencies and signals received at the second band of frequencies are converted to signals within the first band of frequencies so that they may be processed by the first radio telephone system of the first frequency band. Mobile stations are identified by the subscriber group identification register for their subscriber group enabling distinct services and distince system parameters. Information concerning each mobile station of the first and second subscriber groups is obtained from the first and second subscriber information register databases.

2 Claims, 8 Drawing Sheets

MULTI-BAND CELLULAR RADIOTELEPHONE SYSTEM ARCHITECTURE

FIELD OF THE INVENTION

This invention relates to multi-band cellular radiotelephone systems in which the different bands are dedicated to different service providers.

BACKGROUND OF THE INVENTION

Radiotelephone cellular service areas are typically divided among two or more service providers. Each service provider operates within a distinct frequency band which is unique to its customers. An example is the division of serving areas into two distinct frequency bands 800 MHz and 1.5 GHz serving two distinct groups of subscribers (e.g. PDC Personal Digital Cellular, a Japanese standard). Another examples is GSM (i.e. Groupe Speciale Mobile, a European Standard). These separate groups of subscribers may be served by a commonly owned but using separate and independent equipment bases to provide service area call processing and air interface service. In most cases each group of subscribers is served by a different service provider. Such is the case in Japan where different service providers serve different subscriber groups at different frequencies as presently allowed by the controlling digital cellular standards (PDC) in Japan.

As presently contemplated, by PDC, the cellular system serving each band is constructed and designed for only one band of frequency. The provision of service in each of the two bands hence requires the provision of separate and distinct mobile switching centers, base station controllers and radio transceiver units due to the division of the serving frequencies. The different services are reflected only in frequency since they both share common call processing arrangements and protocols. This requires the duplication of equipment whose only distinct feature is to function at two widely disparate frequencies.

SUMMARY OF THE INVENTION

A dual frequency cellular radiotelephone system, with a common provider serving two different subscriber groups or having different service providers, serving mobile subscribers at first and second distinct frequency ranges, uses front end frequency conversion techniques, to serve both frequency ranges with a minimum of equipment duplication. A first service group is serviced by a first system including a mobile switching center (MSC), a first base station controller (BSC), first transmission equipment, first radio transceiver equipment, a first linear amplifier and a first antenna. This entire train of components is designed to support air interface transmission and reception at the first frequency band at which the first group is served.

In accord with one aspect of the invention a dual frequency cellular radiotelephone system serves mobile subscribers in two different subscriber groups at first and second distinct frequency ranges using a common MSC. These first and second distinct frequency ranges in the illustrative embodiment are 800 MHz and 1.5 GHz. The first group (800 MHz) is served through a serial array of transmission and radio equipment that includes a radio transceiver, amplifier and antenna operative in the 800 MHz band of frequencies. The second subscriber group is served by equipment to operate in the air interface at 1.5 GHz which is connected directly to the radio transceiver serving the 800 MHz band. The equipment dedicated to the second subscriber group (1.5 GHz) includes a frequency converter operative for converting downlink signals from the first frequency range (800 MHz) serving the first group to the second frequency range (1.5 GHz) serving the second group of subscribers. Similarly uplink signals from at the second group of frequencies (1.5 GHz) are converted to the first group of frequencies (800 MHz) and applied to the radio transceiver at that frequency.

A common MSC services both 800 MHz and 1.5 GHz bands, in the aforementioned arrangement, and has connected thereto first and second subscriber group identification registers (SGIR) providing a data base for the two distinct subscriber groups of both systems. The subscriber group identification registers can identify from the MS ID the particular service provider of that MS. Hence the cellular system of each service provider is organized in the overall system to operate as a virtual dual cellular system.

A cellular telephone system radio base station in accord with the invention may serve two distinct groups of subscribers at two different frequency ranges and at two different geographical locations. In such a system a first radio telephone cellular system (800 MHz) includes 800 MHz radio base stations (RBS), which comprises a signal transmission facility in combination with a 800 MHz radio transceiver and a first air interface (800 MHz) serves the first group of subscribers. The second group of subscribers (1.5 GHz) are served, by 1.5 GHZ RBSs, which comprise a second signal transmission facility, a 800 MHz radio transceiver and a frequency converter, connecting the 800 MHz radio transceiver to a 1.5 GHz air interface. The frequency converter provides uplink and downlink signals in the 1.5 GHz frequency range assigned to the second group of subscribers. The signal transmission facilities allow the 800 MHz and the 1.5 GHz RBSs the capability of communicating with a geographically distant MSC.

Communication between the signal transmission facilities and the common MSC may be by T1 carrier metallic cable or by optical transmission communication cable.

In another aspect of the invention a system designed to serve one particular group of subscribers may be shared with another group of subscribers with distinct virtual systems by applying frequency conversion techniques to enable the station equipment to service the other group of subscribers.

DETAILED DESCRIPTION

Figure 1:
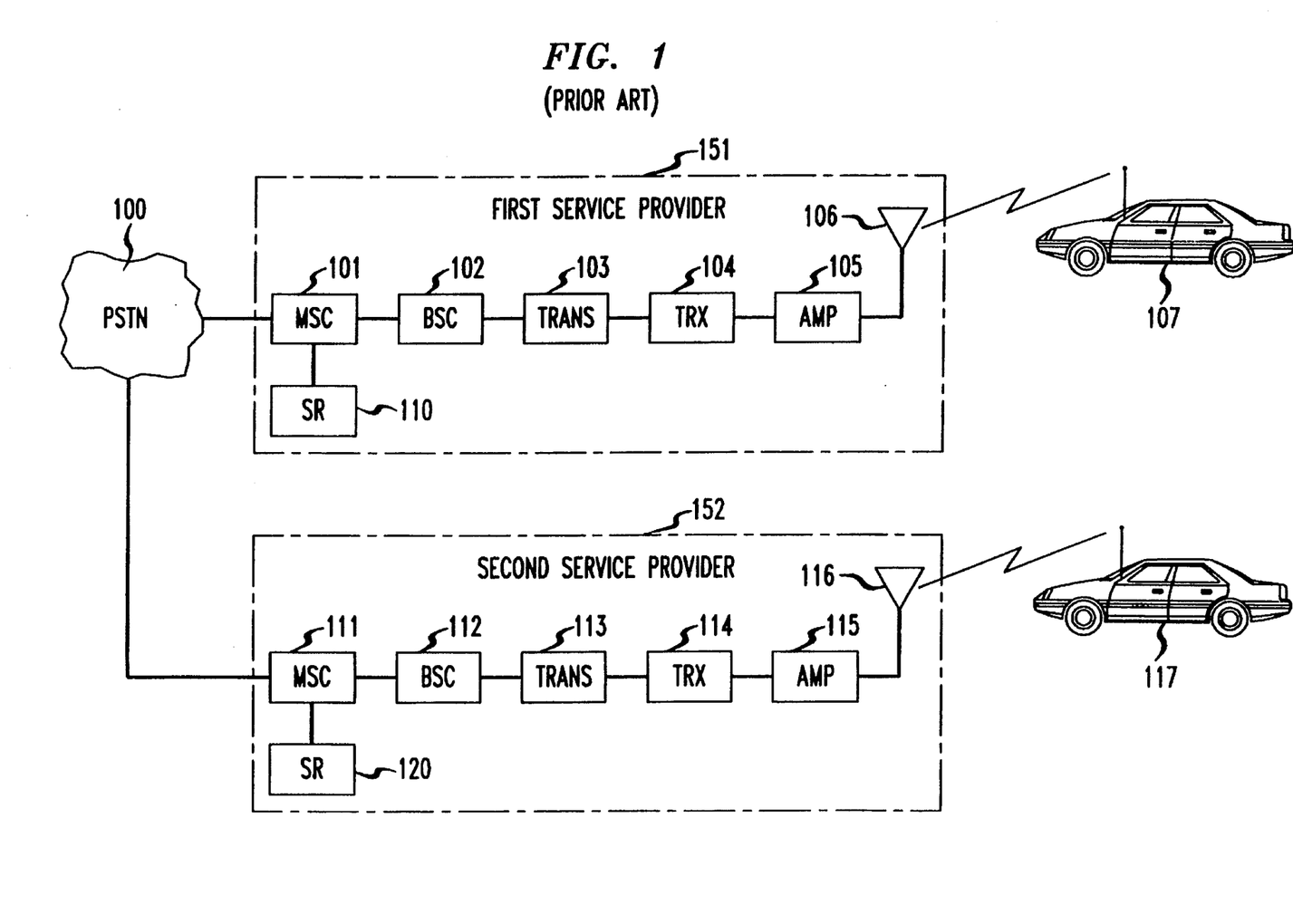
FIG. 1 is a schematic of two separate cellular radiotelephone services operating at two distinct frequency bands and serving different customers within a common serving area.

A conventional cellular radiotelephone system which enables two independent service providers to provide radiotelephone service to two groups of subscribers is shown in FIG. 1. Each service provider has an independent system to supply service at a different frequency band. The first system 151 to supply radiotelephone service between mobile subscribers (MS) 107, customers of the first service proveder 151, and the public switched telephone network 100. This first system is operative at a first frequency band and includes a mobile switching center 101, a base station controller (BSC) 102, a signal transmission facility 103, a transceiver 104, an amplifier 105 and an antenna 106. A subscriber information register (SR) 110 contains the data base of mobile subscribers 107 served by this first system.

A second radiotelephone system 152 of a second service provider to service MSs 117, subscribing to that service, includes of a mobile switching center (MSC) 111 with an associated subscriber information register (SR) 120, that includes the data base of subscribers served by the second system, a base station controller (BSC) 112, a transmission circuit 113, a transceiver 114, an amplifier 115 and an antenna 116. The components of each system are very similar since the two systems have the same call processes and protocols. The equipment differs only in the circuitry processing signals in the frequency band that is to be serviced.

Figure 2:
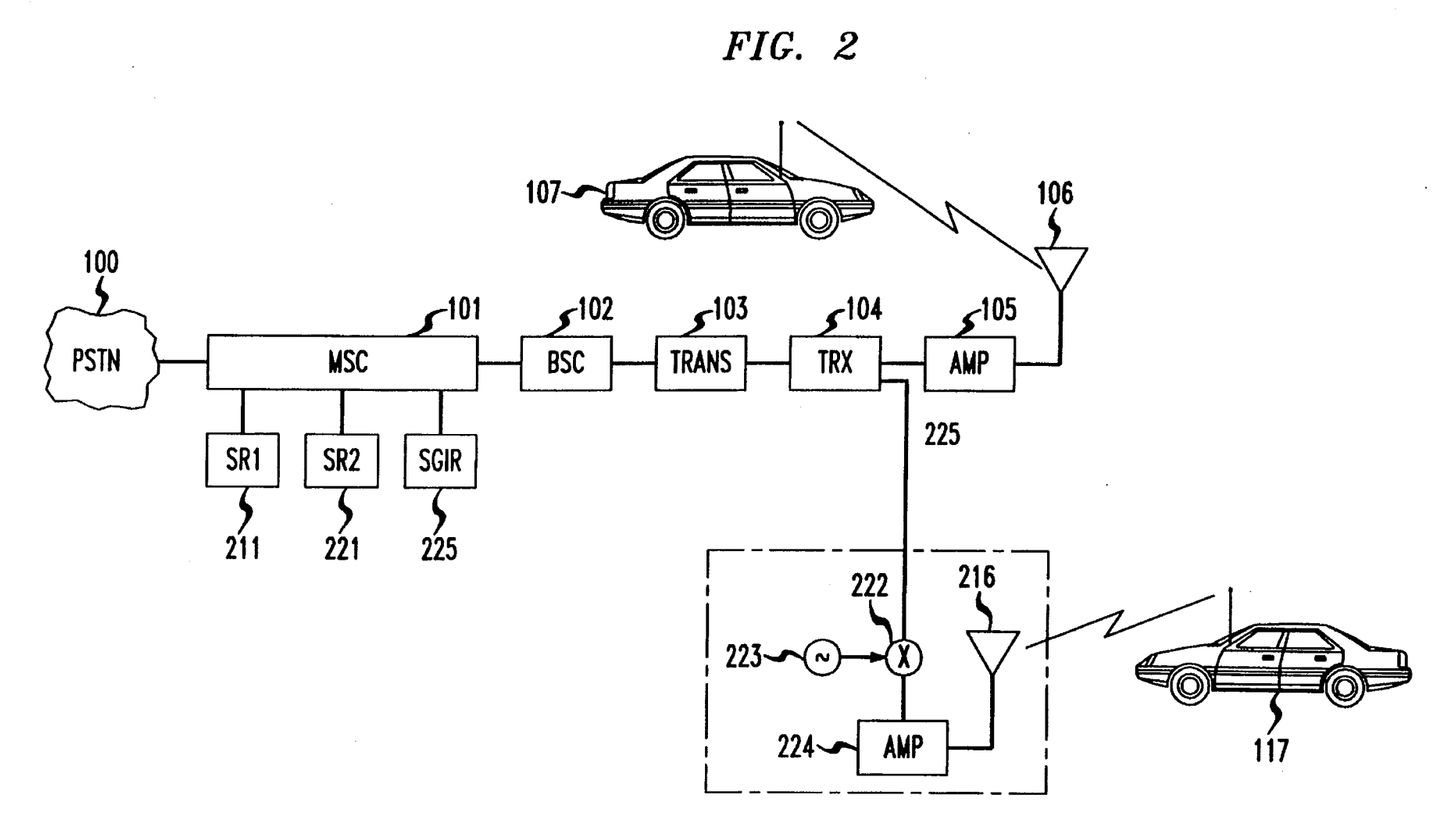
FIG. 2 is a schematic of an arrangement for minimizing equipment duplication in a cellular radiotelephone system serving two different customer groups at differing frequency bands.

A radiotelephone system providing service, by both service providers, to MSs at both frequency bands while maximizing the use of common call processing equipment is shown in the schematic of FIG. 2. This readily enables dual band frequency simultaneous service to the MSs of both systems using coming call processing equipment with the exception of the air interface equipment. As shown both service providers may use a common mobile switching center 101, a common base station controller (BSC) 102, a common transmission circuit 103, and a common transceiver 104. A subscriber information register (SR1) 211 and (SR2) 221 is coupled to the MSC 101 to provide data base information on the MSs of both systems. Also a subscriber group identification register (SGIR) 225 is coupled to MSC 101 to provide database information on the subscriber group of the MSs. Service to the MSs 107 of the first frequency band is via the transceiver 114, the amplifier 115 and the antenna 106 in the same manner as MS 107 is served in the system of FIG. 1.

A frequency converter 222 is connected to the output line of the transceiver 104 or in the alternative by a coupler 225 to the output line of the transceiver 104. A mixing signal is supplied by a local oscillator 223. The frequency converter 222 is connected via the bidirectional amplifier 224 to the antenna 216 radiating outgoing signals and receiving incoming signals. Incoming signals from MSs 117 operating at the second frequency band are received by antenna 216 and are converted to a signal at the first frequency band by the frequency converter 222. The signal converted to the first frequency band is coupled to the transceiver 104 by the coupler 225. The equipment enclosed within the dotted line 231 is dedicated solely to the second frequency band range. The incoming radiotelephone signal, at the second frequency band, is converted to the first frequency band and is applied, via the coupler 225, to transceiver 104, to be processed at the first frequency band by the same call processing equipment used for serving the subscribers using the first frequency band. MS 117 is identified as belonging to the second subscriber group by the subscriber group identification register (SGIR) 225 and its subscriber information is obtained from the subscriber information register (SR2) 221.

In one particular embodiment, both frequency band outputs may be used to serve a common MS. The two frequency outputs may be transmitted to MSs having the capability for accepting both frequency bands to provide frequency diversity to the MS 218 which is capable of transmitting and receiving radio telephone signals in both of the radiotelephone frequency bands.

Figure 3:
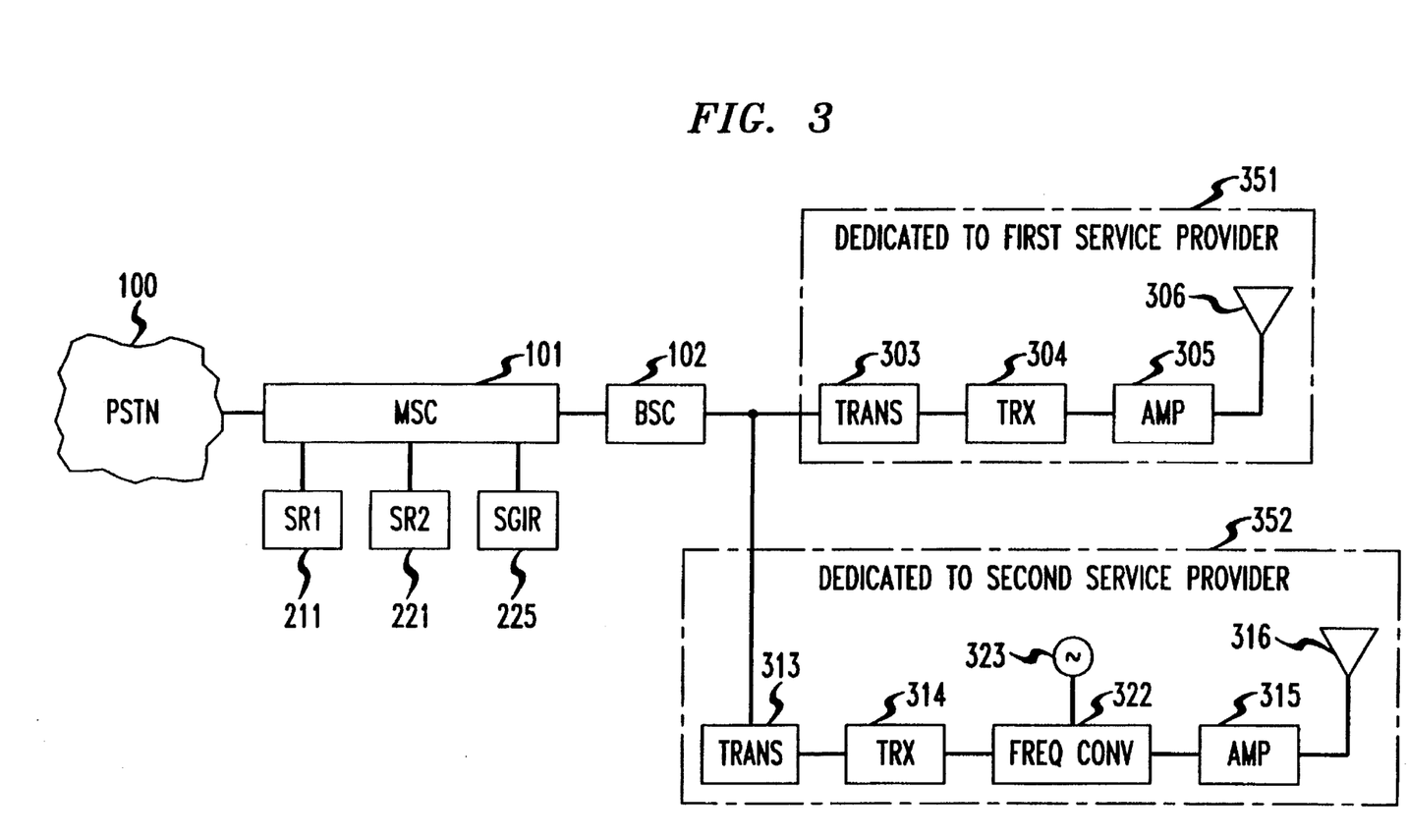
FIGS. 3, 4 and 5 are schematics of further arrangements for minimizing equipment duplication in a cellular radiotelephone system serving two different customer groups at differing frequency bands.

A virtual dual system shown in FIG. 3 provides service to two groups of mobile subscribers normally serviced by two different service providers each operating within differing frequency ranges. The system for serving the first group of subscribers includes the MSC 101 connected to the PSTN 100. The MSC 101 is connected to the BSC 102 which is in turn connected to the equipment 351 dedicated to the first subscriber group. This equipment includes a signal transmission facility 303. This is in turn connected to the transceiver 304. the output of the transceiver 304 is connected via amplifier 305 to antenna 306 which radiates and receives signals to and from the first subscriber group at the first frequency band.

The second subscriber group, serviced by a second service provider and operating within the second frequency band, equipment dedicated to the second service provider as designated by 352. This equipment includes a transmission facility 313 connected to the BSC 302. The output of the signal transmission facility 313 is connected via the transceiver 314 providing service in the first frequency band and amplifier 315 to the radiation and reception antenna 316 providing service in the second frequency band, and the frequency converter 322.

Figure 4:
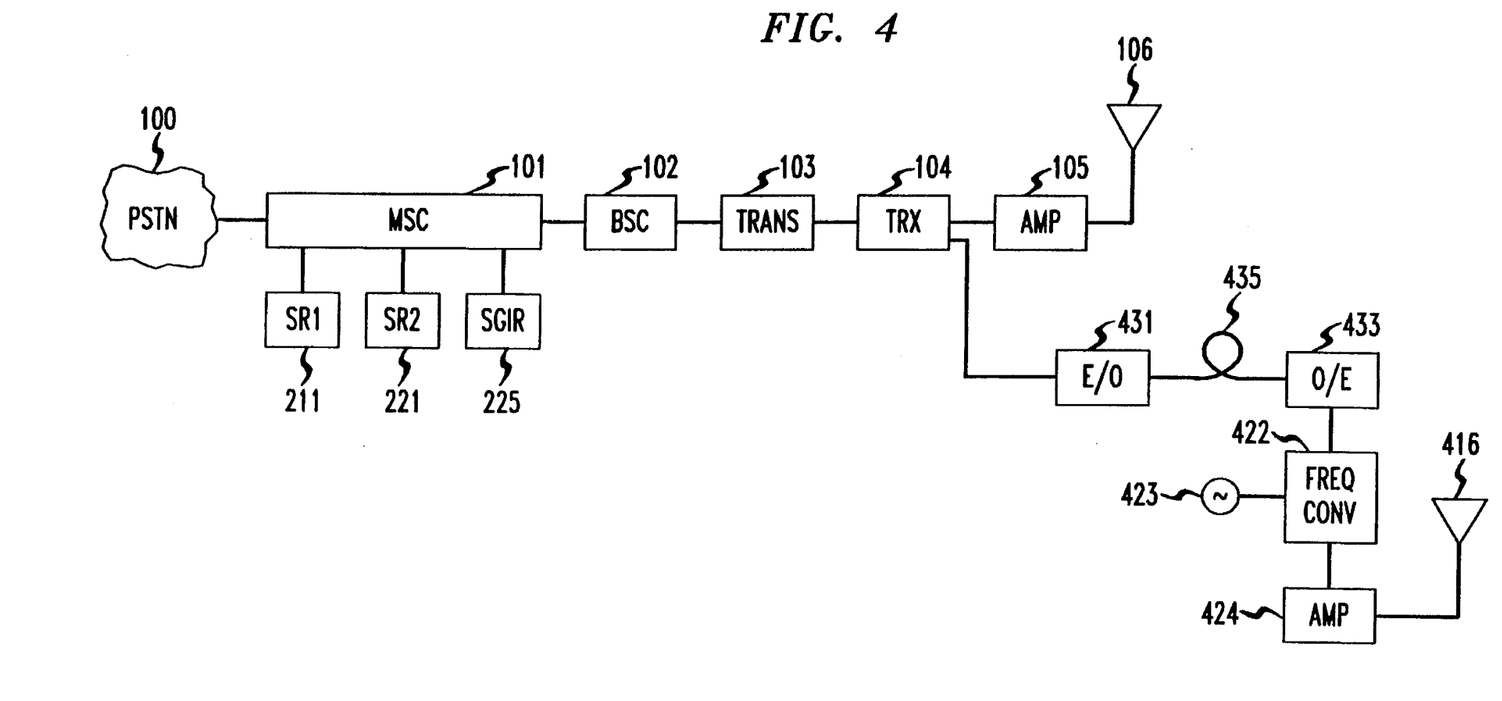

Another arrangement for servicing the subscribers of two different service providers is shown in the FIG. 4 The PSTN 100 is connected to the MSC 101 which is in turn directly connected to the BSC 102, the signal transmission control 104 and the amplifier 105. This system is operated at the first frequency band and the antenna radiates radiotelephone signals to and receives radiotelephone signals from the first group of subscribers.

An auxiliary processing system for servicing the second group of subscribers is coupled to the TRX 104. The downlink output from the TRX 104 is connected to the electrical/optical converter 431 which is coupled via a transmitting optical fiber cable to the electrical/optical converter 433. Converter 433 is connected to the frequency converter 422 which in response to the local oscillator 423 converts signal frequencies between the first and second bands of the first and second subscriber groups. The uplink signals are received at the antenna 416 and are fed into the TRX 104 input through the reverse path.

Figure 5:
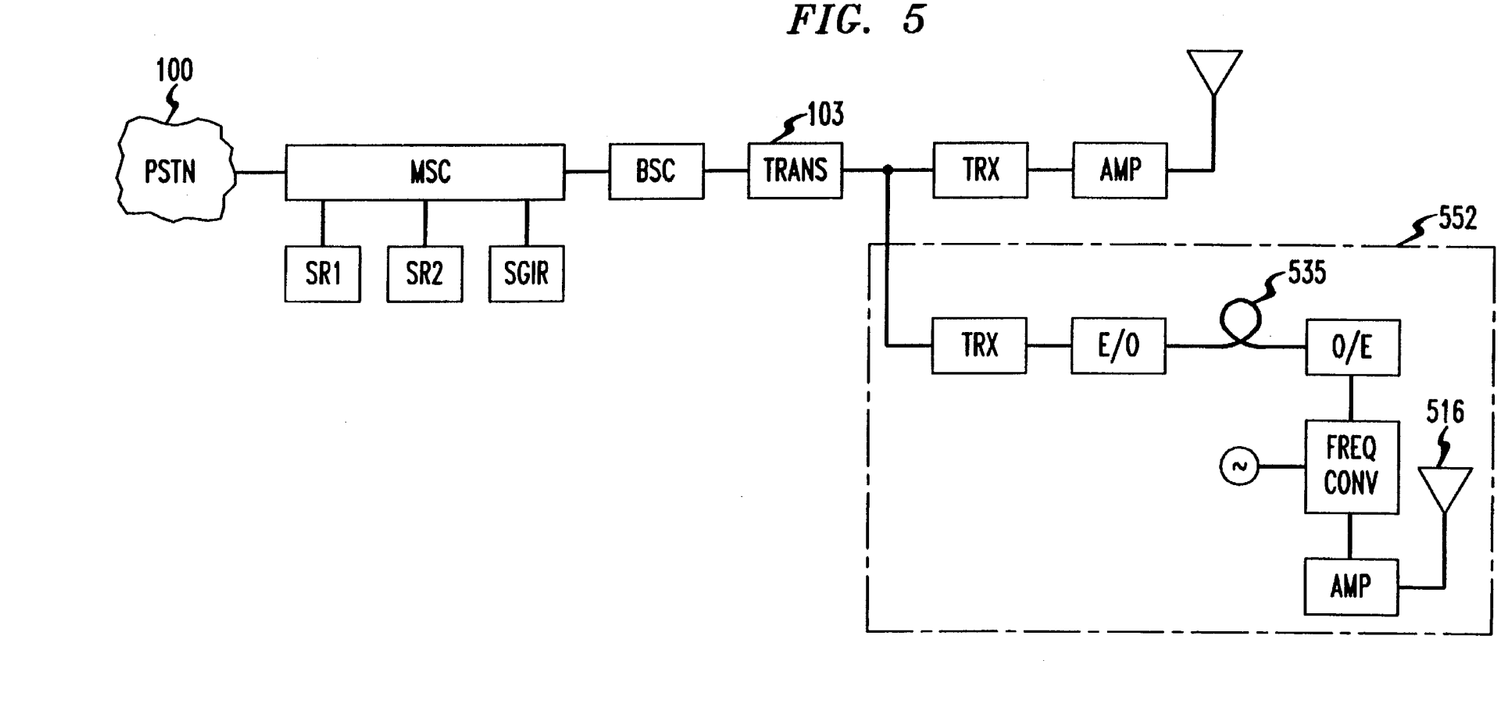

In the arrangement shown in the FIG. 5 the system is designed to service both service providers with a minimum of equipment duplication. The two systems share a common signal transmission facility 103 and hence the two radiation and reception antennas 106 and 516 are substantially co-located. The equipment 552 dedicated to the second group of subscribers serviced by a second service provider includes a fiber optic cable 535 allowing the antenna 516 to be located remotely from the first antenna 106.

Figure 6:
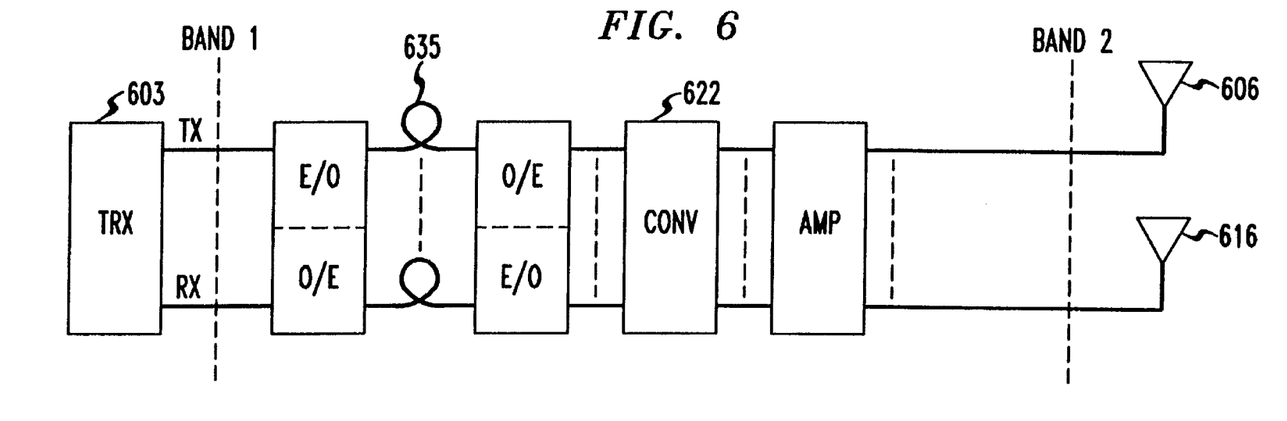
FIGS. 6 and 7 are schematics of arrangements using optical transmission methods for multiple-band cellular service system applied to a sectorized service area.

Many cell areas are served by directional antennas with the cell area divideed into various sectors. The system shown in the FIG. 6 shows how a transceiver 603 may be connected to antennas 606 to 616 in various sectors by separate optical fiber cables 635, with each individual cable being dedicated to a single sector. The cables are connected to separate frequency converters included in a cabinet 622 containing the frequency converters. The frequency converters are connected through an amplifier bay to a plurality of antennas 606 to 616, with each antenna serving a separate sector output. The TRX 603 operates at a first band of frequencies while the antennas 606 to 616 radiates at a second band of frequencies.

Figure 7:
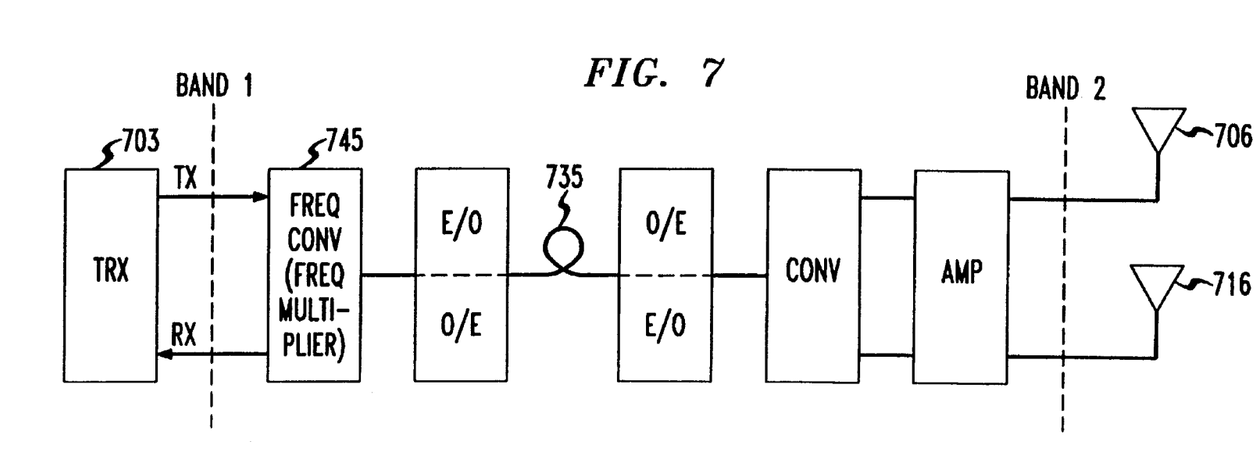

In the arrangement of FIG. 7 the output of the transceiver 703 is applied to a frequency multiplexer 745 and transmitted over a single optical fiber cable 735 to a frequency converter coupled the antennas 706 to 716. This cable carries the plural signals each supplied by the frequency multiplexer 745. The transceiver 703 operates at a first band of frequencies while antenna 706 to 716 operate at a second band of frequencies.

Figure 8:
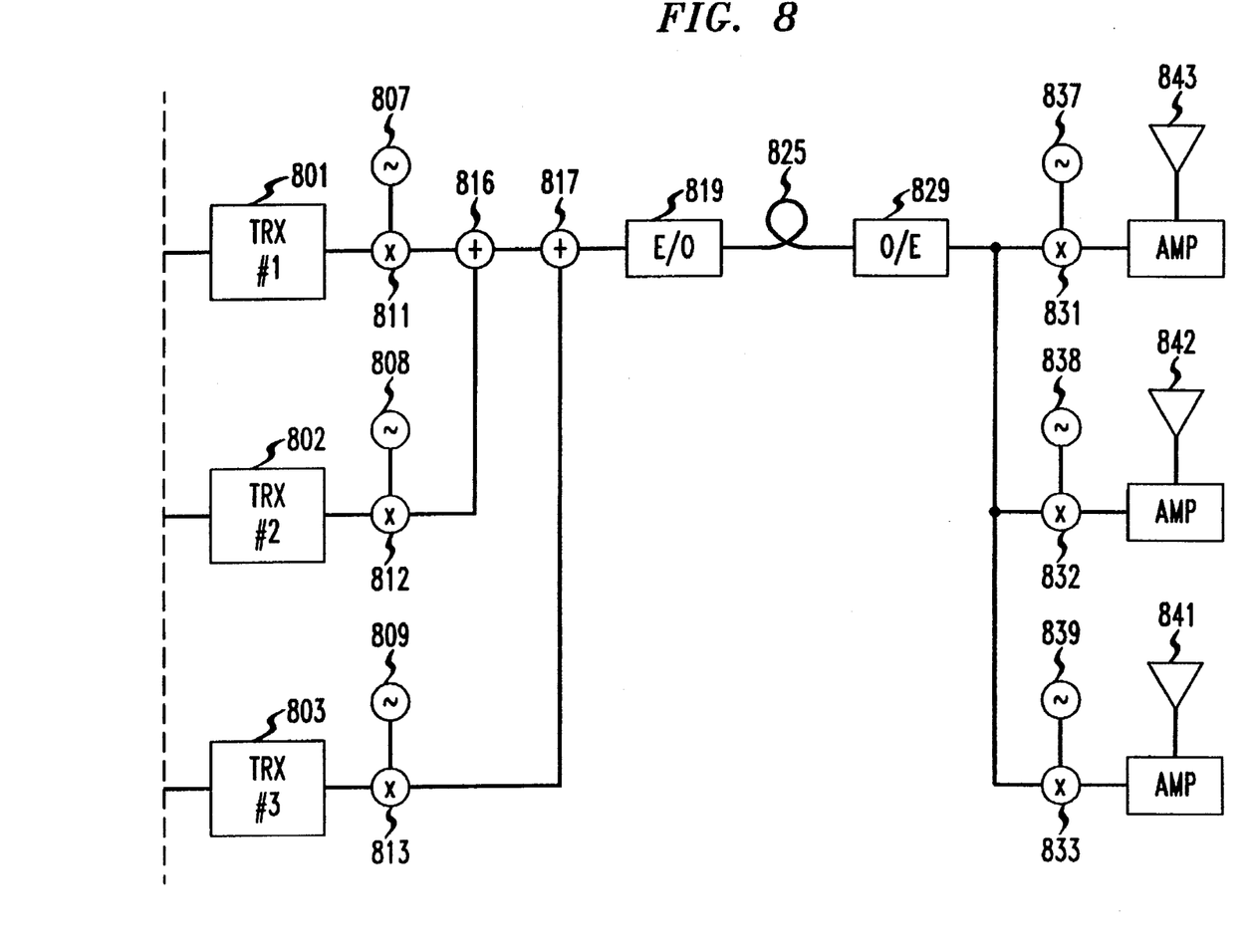
FIGS. 8 and 9 are detailed schematics of a transmitting and receiving system, respectively, for multi-band cellular service system applied to a sectorized service system such as illustrated in FIG. 7.
Figure 9:
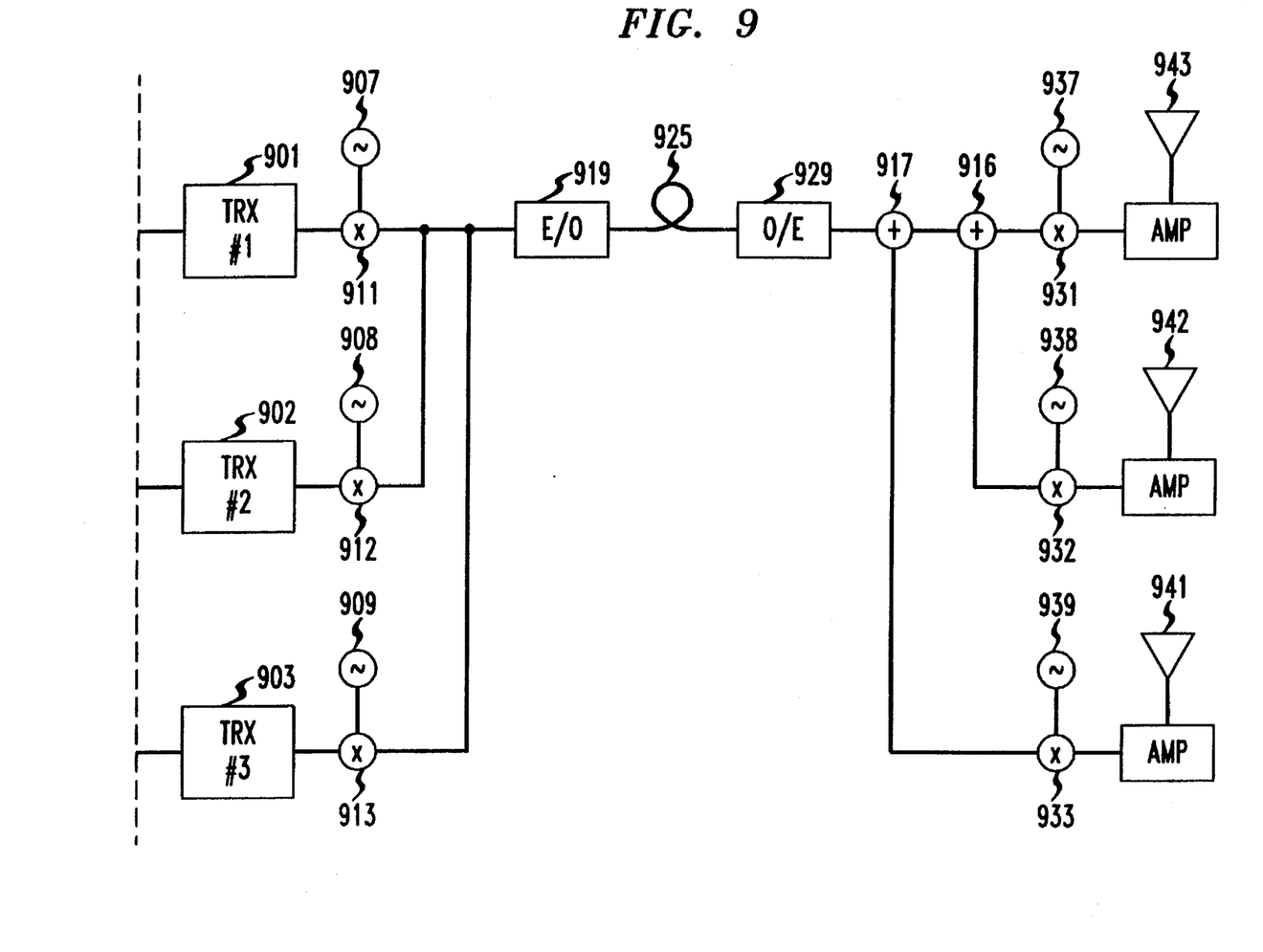

A cellular radiotelephone system for operating where a plurality of frequency bands defines different service sectors is shown in the FIGS. 8 and 9. In the FIG. 8 the transmitting aspect of the base station uses three transceivers 801,802 and 803, one for each sector to be radiated by the antennas 841,842 and 843. Three base station radio transceivers (TRX), 801,802 and 803, each providing service through optical fiber 825 to a different sector at a different frequency segment, are each connected to a mixer or frequency converter 811, 812 and 813, respectively. Each frequency converter is connected to a local oscillator 807, 808 and 809 respectively. The respective frequencies are $f_1$ for oscillator 807; $f_2$ for oscillator 808 and $f_3$ for oscillator 809. The output of each frequency converter is at a frequency band. These outputs are summed in the summing circuits 815 and 817 to form a composite signal which is applied to an electrical to optical converter device 819. The resulting optical signal is transmitted over an optical fiber cable 825 to the optical to electrical converter 829 at the remote end of the fiber cable 825. The output of the optical to electrical converter is applied in parallel to the three frequency converters 831 832 and 833. The local oscillators 837, 838 and 939 apply the signal frequencies $f'_1$–$f'_2$ and $f'_3$ to the converters 831,832 and 833. This enables the downlink signals at the output of the antennas 841 842 and 843 to serve the second frequency band originally transmitted by the transceivers 810, 802 and 803 serving the first frequency band.

The reception arrangement is shown in the FIG. 9. The uplink signals for each of the three sectors are received by the antennas 941,942 and 943. Uplink signals received at these antennas are processed by a converter serving the second frequency band. These signals are converted in frequency to the frequencies $g'_1$, $g'_2$ and $g'_3$ by the frequency converters 931,932 and 933 in response to the local oscillator sources 937,938 and 939. The frequency converter signals are combined in the combining circuits 916 and 917 and applied to the electrical to optical conversion circuit 929. The optical signal is transmitted via the optical cable 925 to the optical to electrical converter 919 and applied to the frequency converters 911, 912 and 913 to provide the appropriate frequency to the radio transceivers 901,902 and 903 serving the first frequency band.

While the invention has been describeed with reference to specific frequency ranges of a specific system arrangement it is readily apparent that many variations of this arrangement varied to serve differing systems at different frequency may be devised by those skilled in the art without departing from the spirit and scope of the invention.

The invention claimed is:

1. In a cellular radiotelephone system for serving first and second distinct groups of mobile subscribers operating at first and second distinct radiotelephone communication frequency ranges;

a communication station for providing distinct cellular radiotelephone systems for serving first and second distinct subscriber groups at the first and second distinct frequency ranges utilizing a common call processing system:

comprising means for processing telephone signals with a mobile switching center (MSC) to interconnect a public switched telephone network to a first cellular telephone system operating within a first one of the distinct frequency ranges and serving the first distinct subscriber group;

means for serving a second cellular telephone system operating at a second frequency within the second frequency range by converting uplink signals from the second subscriber group at the second frequency to the first frequency and converting downlink signals directed to the second distinct subscriber group to the second frequency from the first frequency; and means for processing these telephone signals with the MSC;

means for providing first and second subscriber information data bases each describing attributes of mobile stations of the first and second subscriber groups, respectively; and means for providing a subscriber group identification data base for identifying the distinct subscriber groups;

means for processing calls with the first subscriber group with the first cellular telephone system in conjunction with the first subscriber information data base;

means for processing calls with the second subscriber group with the second cellular telephone system by converting the frequency of downlink signals to the second group of subscribers from the first frequency to the second frequency and uplink signals from the second group subscribers from the second frequency to the first frequency;

means for processing signals to and from the first group of subscribers in response to data in the first subscriber information data base and processing signals to and from the second group of subscribers in response to data in the second subscriber information data base.

2. In a cellular radiotelephone system for serving first and second distinct groups of mobile subscribers operating at first and second distinct radiotelephone communication frequency ranges; as claimed in claim 1:

including:

means for transmitting and receiving signals at the first frequency range between a feed access and the frequency converter over an optical transmission facility.

* * * * *